United States Patent [19]

Edgar et al.

[11] Patent Number: 5,083,362
[45] Date of Patent: Jan. 28, 1992

[54] METHOD FOR MAKING A VEHICLE ANTI-THEFT KEY WITH RESISTOR

[75] Inventors: James R. Edgar; Eric J. Neusen, both of Milwaukee, Wis.

[73] Assignee: Briggs & Stratton Corp., Wauwatosa, Wis.

[21] Appl. No.: 626,759

[22] Filed: Dec. 13, 1990

[51] Int. Cl.⁵ ............... B23P 19/04; E05B 49/00; E05B 19/00

[52] U.S. Cl. ........................ 29/509; 29/515; 70/278; 70/460

[58] Field of Search .......... 29/509, 515, 521, 441.1, 29/407, 437, 438, 439; 70/278, 460, DIG. 46; 403/274; 72/416

[56] References Cited

U.S. PATENT DOCUMENTS

| | | | |
|---|---|---|---|
| 1,438,839 | 12/1922 | Levey | 70/460 X |
| 4,663,952 | 5/1987 | Gelhard | 70/278 |
| 4,734,693 | 3/1988 | Dluhosch et al. | 70/278 X |
| 4,868,409 | 9/1989 | Tanaka et al. | 70/278 X |

FOREIGN PATENT DOCUMENTS 230484 8/1987 European Pat. Off. ............. 70/460

Primary Examiner—Joseph M. Gorski
Assistant Examiner—Peter Dungba Vo
Attorney, Agent, or Firm—Andrus, Sceales, Starke & Sawall

[57] ABSTRACT

A key with a resistor pellet is assembled by mechanically inserting the pellet into a suitable aperture in the key and displacing a portion of the key material into the body of the pellet by compressing the key around the perimeter of the pellet in a swaging process. The pellet is automatically selected from a plurality of pellets having a plurality of distinctive resistance properties. The pellet is tested to determine conformance with a preselected resistance property prior to insertion in the key. After insertion and swaging of the pellet in the key, the resistance properties of the pellet are reconfirmed.

18 Claims, 10 Drawing Sheets

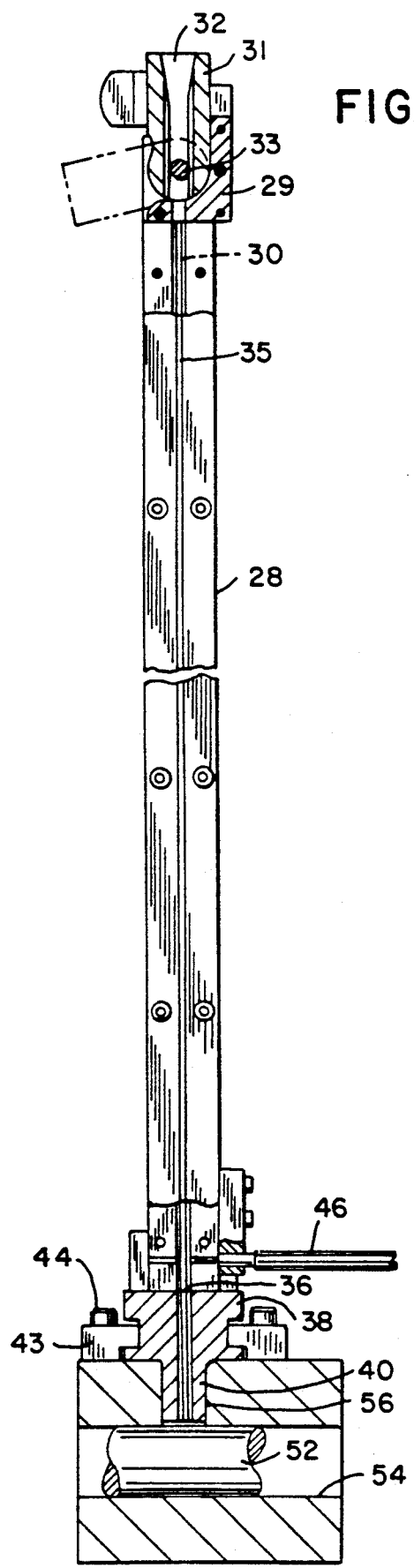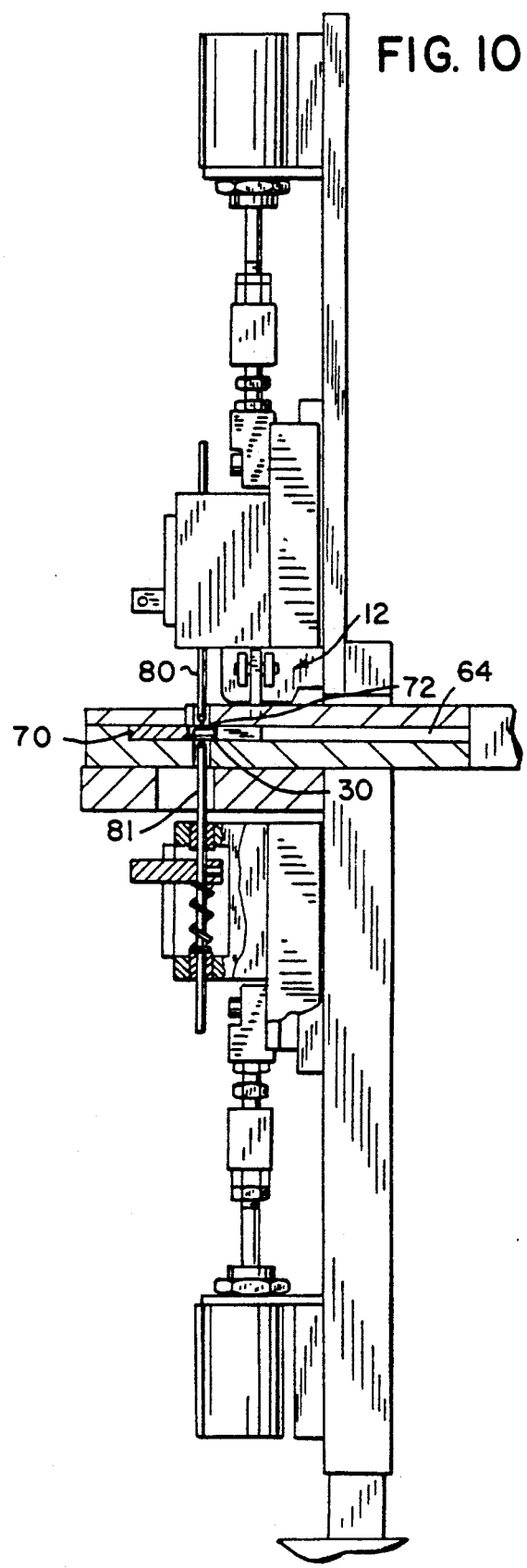

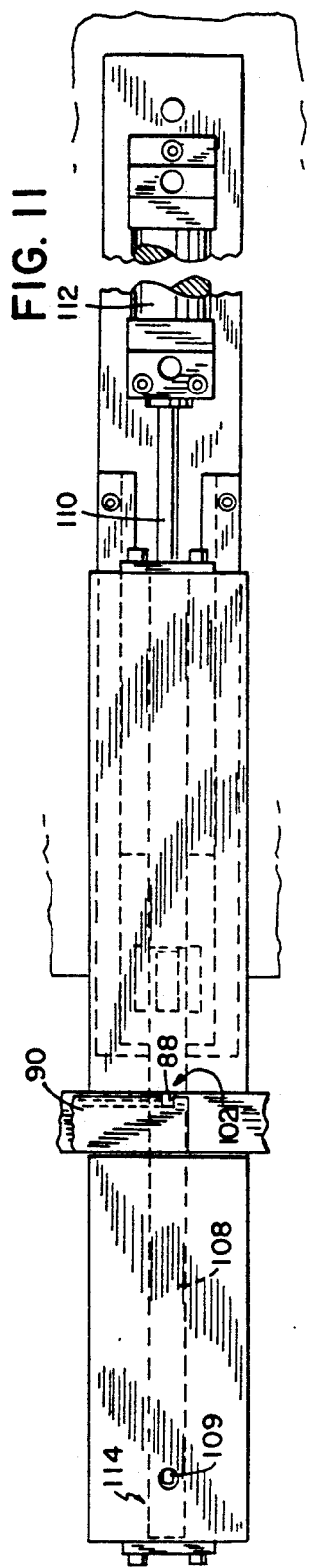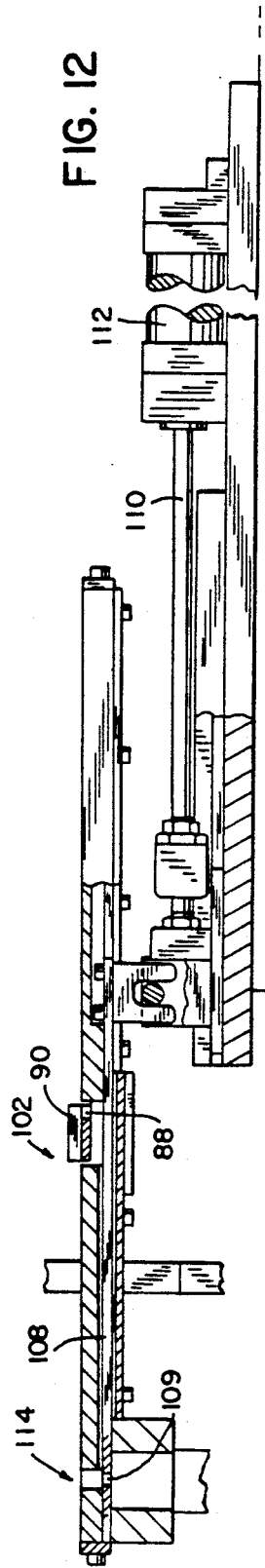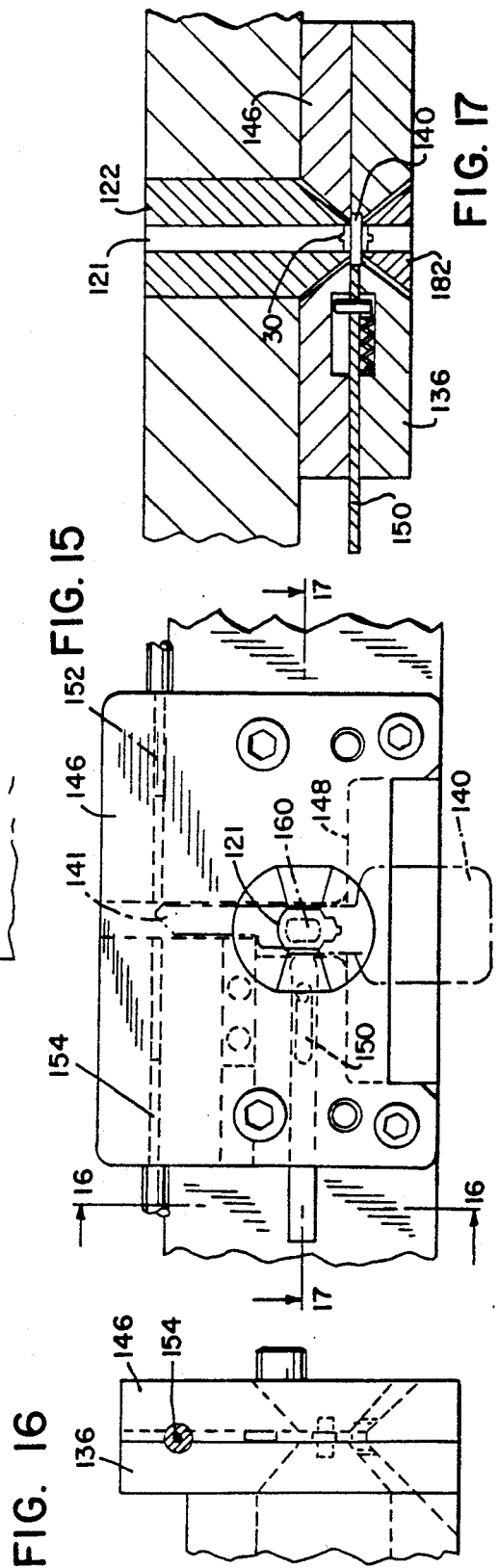

FIG. 13
FIG. 14
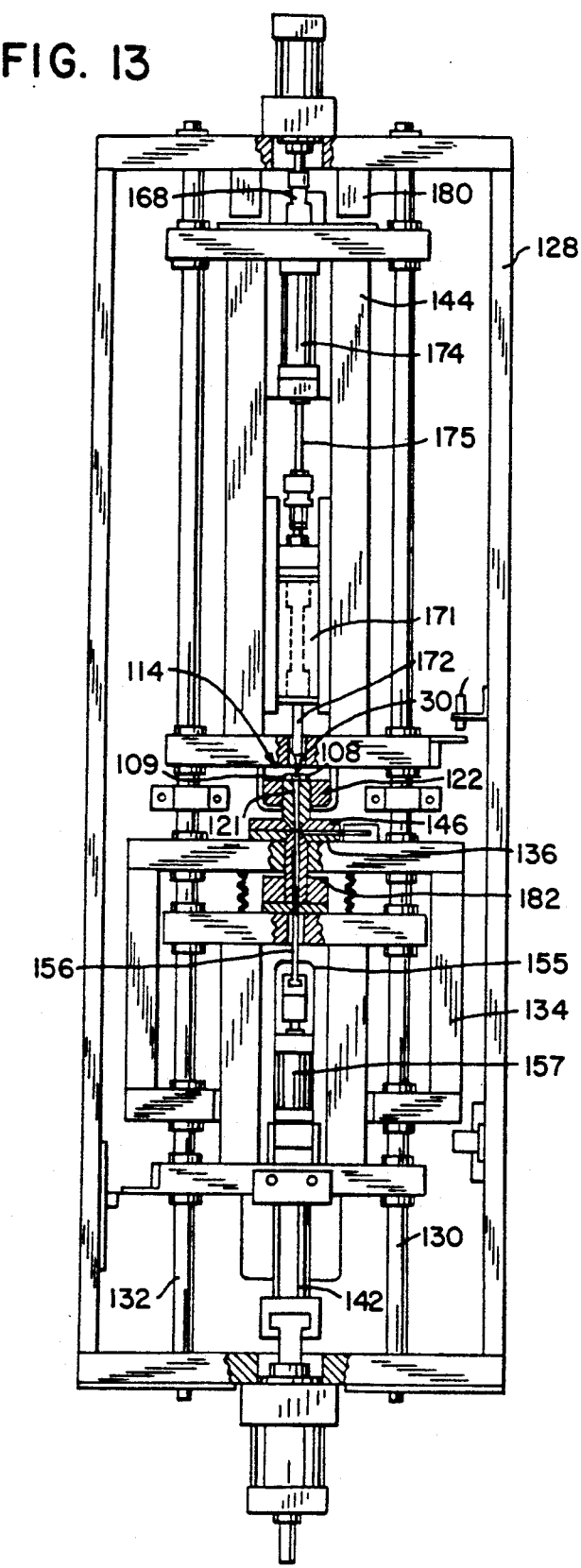
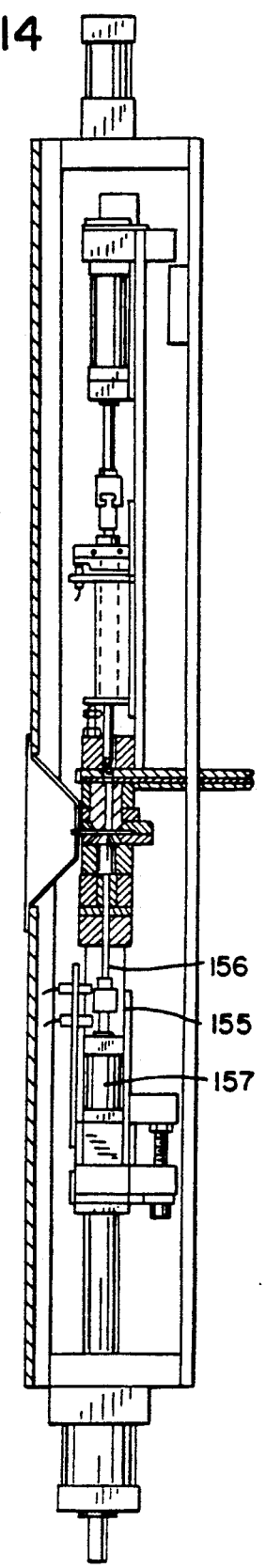

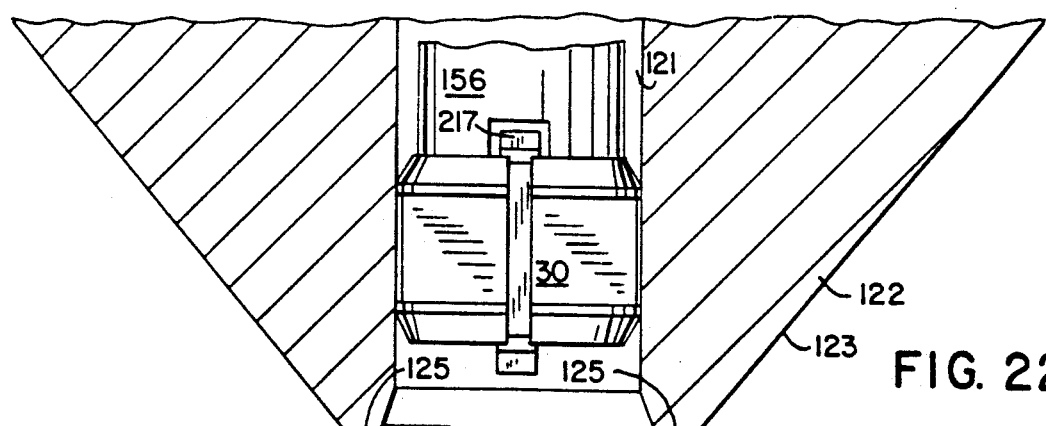
FIG. 22
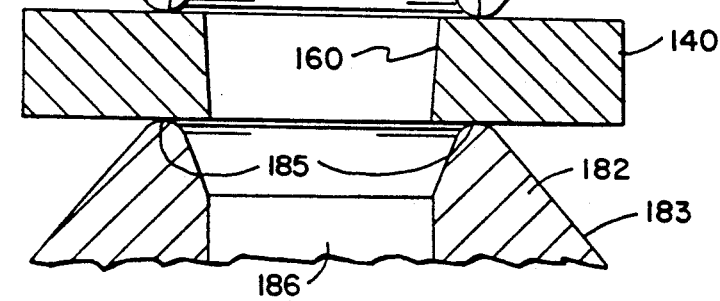
FIG. 23
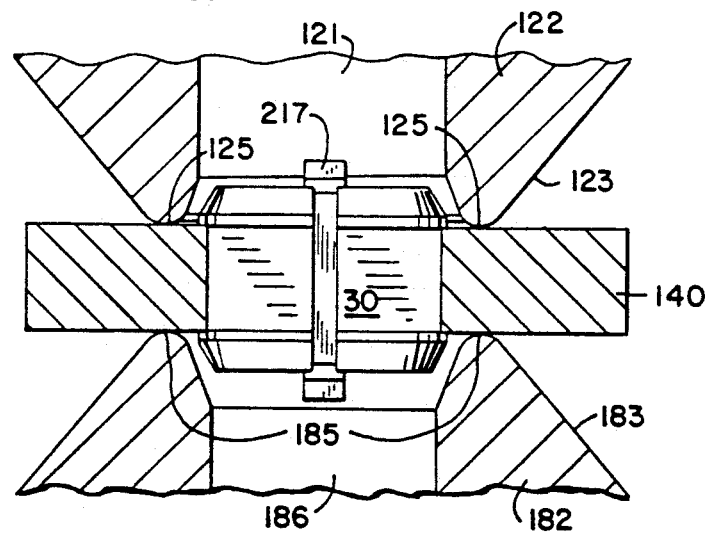
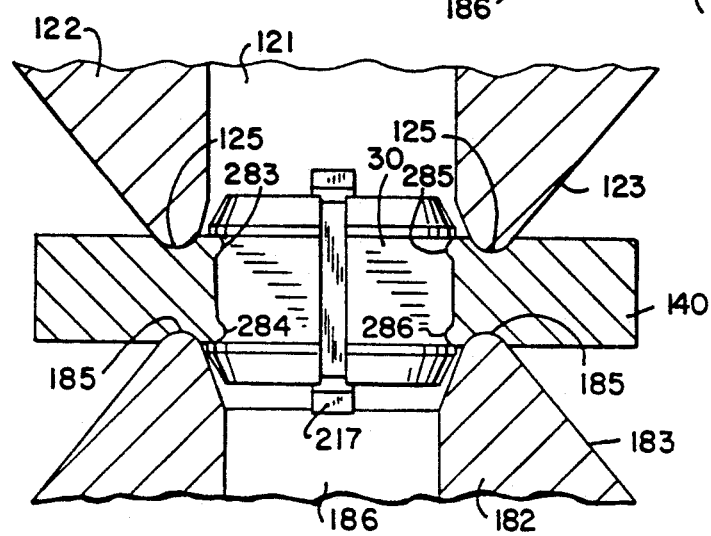
FIG. 24

METHOD FOR MAKING A VEHICLE ANTI-THEFT KEY WITH RESISTOR

BACKGROUND OF THE INVENTION

This application is related to application Ser. No. 550,376, entitled: "KEY ASSEMBLY FOR VEHICLE ANTI-THEFT SECURITY SYSTEM", filed by J. Edgar on July 10, 1990 and assigned to the assignee of the subject invention.

This invention is related generally to a method and apparatus for making a key assembly having an integral electrical resistor and is specifically directed to a method and apparatus for mechanically securing a resistor pellet in a mechanical key.

The development of numerous different electronics Vehicle Anti-Theft Security (VATS) systems for an automobile has taken place over the years. One such system incorporates the use of a resistor pellet in an ignition key, as shown in co-pending application U.S. Ser. No. 550,376. As there shown, a resistor pellet is provided in a typical mechanical ignition key, the pellet providing for a resistor of known resistance value so that upon insertion and rotation of the key in an automobile ignition cylinder, an electrical current is applied to and through the resistor. A decoding circuit performs a resistance comparison between the pellet in the key and a known resistance "window" in the circuit. If the resistance is within the window, the automobile may be started. If the resistance does not match the "window" value, the automobile will not start.

It is known to provide attachment of the resistance pellet to the key by sonic welding techniques or by use of adhesives. A disadvantage with either of these methods is that flashing, caused by sonic welding, or over-application of adhesive can cover or partially obstruct the exposed metal surface contacts of the resistor element embedded in the plastic pellet. If the contacts become obstructed, the resistance value of the pellet may be misread by the decoding circuit, rendering the key inoperative.

Use of adhesives or sonic welding are also disadvantageous in that it is required that the key member and the pellet be free of contaminants in order to assure a good bond between the key and the pellet. Dust, oil, humidity and other contaminants interfere with proper bonding, sometimes resulting in a weakened bond between the key and the pellet.

Further, the precision alignment of the pellet in the key is far more critical when either sonic welding or adhesive techniques are used to secure and bond the pellet in the key.

Due to the various disadvantages of the bonding techniques of the prior art, it is required that the manufacturing processes carefully control the exposure of the key and the pellets to various contaminants, and further that the resistance value of the pellet be reconfirmed for proper resistance level once the key and the pellet have been assembled.

SUMMARY OF THE INVENTION

The method and apparatus of the present invention for making a key and resistor pellet assembly relies solely on a mechanical holding force for maintaining the pellet in the key. The mechanical coupling between the key and the resistor pellet is provided by displacing a portion of the metal of the key into the body of the pellet by compressing the key around the perimeter of the pellet in a swaging process. In the preferred embodiment, the pellet includes two peripheral ridges which hold the pellet in place once it is placed in the key aperture. A compression force sufficient to displace key metal is then applied to the key to displace the metal into the pellet and permanently and mechanically hold the pellet in the key.

The present invention provides a means and method for mechanically inserting and permanently securing the pellet in the aperture of the mechanical key by automatically selecting one of a plurality of resistor pellets with a preselected resistance value, verifying the resistance value of the pellet and transferring accepted pellets to a loading station in communication with the key assembly mechanism. The accepted pellet is inserted into a complementary aperture provided in the key, after which the portions of the metal of the key around the perimeter of the aperture are swaged into the pellet to retain it in position.

Upon completion of a specified number of identically encoded keys, each of the keys is inserted in a mated lock for final acceptance. Upon acceptance of a completed lock and mated key assembly, the system is energized to begin the assembly of the next set of keys.

As provided in the present invention, the mechanical coupling between the key and pellet eliminates the risk of altering the resistance value of the pellet, which can be caused by obstruction between the resistor element contacts and the decoder circuit contacts when the key is inserted in the ignition. In addition, the mechanical process is faster by eliminating any welding or cure time and is both more efficient and more cost effective by reducing the need to isolate the key and the pellet from outside contaminants during the assembly process.

The means and method of the present invention not only provide a more durable and more reliable key/pellet assembly but accomplish this at less expense and in less time than known prior art methods.

It is, therefore, an object and feature of the present invention to provide for a flash free, solely mechanical coupling between the key and the pellet.

It is an additional object and feature of the present invention to provide an improved means and method for mounting a resistor pellet in a key member.

It is an additional object and feature of the present invention to minimize the impact of outside contaminants interfering with the bonding between the key and the pellet.

It is an additional object and feature of the present invention to provide a means and method for a low cost production and assembly of a key and pellet assembly for vehicle anti-theft security systems.

Other objects and features of the invention will be readily apparent from the accompanying drawing and description of the preferred embodiment.

DESCRIPTION OF THE DRAWING

FIG. 2 is a plan view of a pellet storage and release magazine for the system shown in FIG. 1.

FIG. 10 is a side plan view of the mechanism shown in FIG. 9.

FIG. 11 is a top plan view illustrating the relationship between the first and second pellet transfer slides at the point of transfer.

FIG. 12 is a side plan view of the mechanism shown in FIG. 11.

FIG. 13 is a front plan view of the pellet and key assembly station and swage press mechanism for the system shown in FIG. 1.

FIG. 14 is a side plan view of the mechanism illustrated in FIG. 13.

FIG. 15 is a fragmentary top plan view illustrating the key and pellet assembly station of the mechanism of FIG. 13.

FIG. 16 is a section view taken generally along line 16—16 of FIG. 15.

FIG. 17 is a section view taken generally along line 17—17 of FIG. 15.

FIG. 22 is an illustration of the pellet inserting step in accordance with FIG. 1.

FIG. 23 is an illustration of the pellet seating step in accordance with FIG. 1.

FIG. 24 is an illustration of the swage press step in accordance with FIG. 1.

DETAILED DESCRIPTION OF THE PREFERRED EMBODIMENT

In the preferred embodiment of the subject invention, one of a plurality of pre-selected glass filled polyester pellets with an integral resistor element of predetermined resistance value is inserted and permanently secured in an aperture of a mechanical key to provide an electronic decoder capability in addition to the mechanical relationship between the key and a mated lock. The key and pellet are more fully disclosed in the co-pending application Ser. No. 550,376 entitled: "KEY ASSEMBLY FOR VEHICLE ANTI-THEFT SECURITY SYSTEM" filed on July 10, 1990 by J. Edgar and assigned to assignee of the subject application, and incorporated by reference herein.

In the preferred embodiment, a set of three identically encoded key assemblies are made for each mated lock. However, as will be readily understood by those skilled in the art, this number is entirely arbitrary. The subject invention provides for a process by which the specific pellet is selected, tested for resistance level, transferred to the key/pellet assembly station, inserted in the key aperture and mechanically secured to the key by a swaging process. The mechanical assembly assures that the resistance characteristics of the pellet are not altered by applying heat or chemicals to the resistor element. It is a feature of the invention that each of the pre-selected number of identically encoded keys may be checked for accuracy upon completion of the assembly process.

Figure 1:
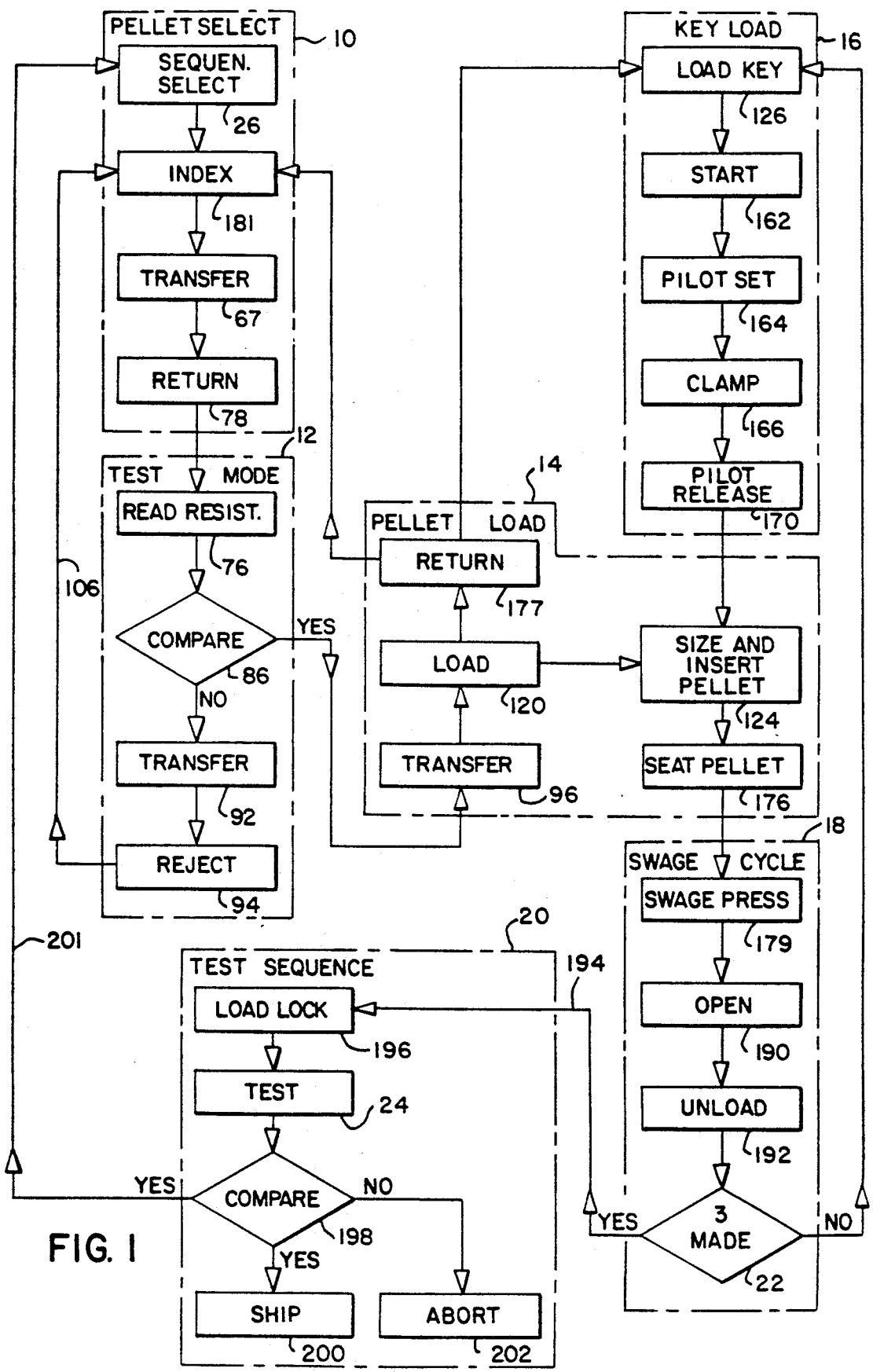
FIG. 1 is a diagrammatic flow chart of the preferred embodiment of an assembly process in accordance with the subject invention.

With reference to FIG. 1, the assembly process of the preferred embodiment includes pellet select mode 10 where a plurality of pellets with different preselected resistance values are sorted and stored for selection and transfer into a test mode 12 where their resistance is read and measured against a standard predetermined value, after which acceptable pellets are transferred into a pellet loading station 14 and rejected pellets are discarded. An apertured key is loaded, as shown at key load step 16 and is clamped into position, after which the loaded pellet is inserted into the aperture provided in the key. Once the pellet has been inserted in the key aperture, portions of the metal around the perimeter of the aperture are swaged into the pellet to retain it in position, as shown at swage step 18. Once the key and pellet are completely assembled, the key assembly is transferred to a test sequence 20 where the assembled key and pellet are inserted into the mated lock and tested for both proper mechanical fit and resistance level. Acceptable key and lock sets are then released for shipment.

As shown in the embodiment of FIG. 1, the key and lock sets are designed to include keys in sets of three for each single lock. To this end, the system is set to monitor and automatically manufacture the three identically encoded keys with each mated lock. As shown at step 22 of the swage cycle, the key load and pellet load sequence is repeated until a set of three identically encoded keys and pellets have been assembled. Upon completion of the third key, the test sequence 20 is initiated and all three of the identically encoded keys are tested for accuracy, as shown at step 24. Upon acceptance of the three keys, the sequential select station 26 of the pellet select mode 10 is energized to select a new pellet with a preselected resistance level for the next set of three keys, and the assembly process is repeated.

FIGS. 2-25 illustrate a specific mechanism for assembling the key and resistance pellet in accordance with the preferred embodiment of the present invention diagrammatically illustrated in FIG. 1. The pellet select mode 10 of the preferred embodiment is illustrated primarily in FIGS. 2-6 of the drawing. The initial test mode 12 is illustrated primarily in FIGS. 5, 9 and 10. The pellet loading step 14 is illustrated primarily in FIGS. 7, 8, 11-14 and 22. The key loading step 16 is illustrated primarily in FIGS. 13-17. The swage press cycle 18 is shown in FIGS. 13, 14 and 24.

As shown in FIGS. 2-6, the pellet select station 10 includes a plurality of pellet storage and feeder magazines 28. Referring specifically to FIG. 2, each magazine includes a supply column of loose pellets 30. All of the pellets in a single magazine have substantially the same resistance level in accordance with pre-defined specifications. Each magazine 28 includes an upper end 29 with a receiver 31 pivotable about the pivot point 33 and including a central through aperture 32 which is in communication with the central axial through passageway 35 of the magazine. When the receiver 31 is in the upright position shown, pellets slide through the aperture 32 into the pellet passageway 35.

The lower end 36 of the magazine is in communication with a transfer block 38 which includes the through passageway 40. The transfer block 38 and magazine 28 are mounted on a distributor housing 42 by suitable means such as the clamps 43 and bolts 44. Sensor 46 such as, by way of example, a Tri-Tronics Fiber Optics Sensor, Part No. BFE36X106, provided at the lower end of the pellet passage 35 to indicate when the associated column of pellets 30 has reached the lower end of the magazine and the magazine is empty.

The sensor 46 indicates when the magazine 28 is exhausted of pellets and no additional pellets are exited from the magazine 28 into the transfer block 38. When the sensor 46 senses the exhaustion of pellets in the magazine 28, a signal is generated in the manner well-known to those skilled in the art to alert the operator that the magazine is empty.

Figure 3:
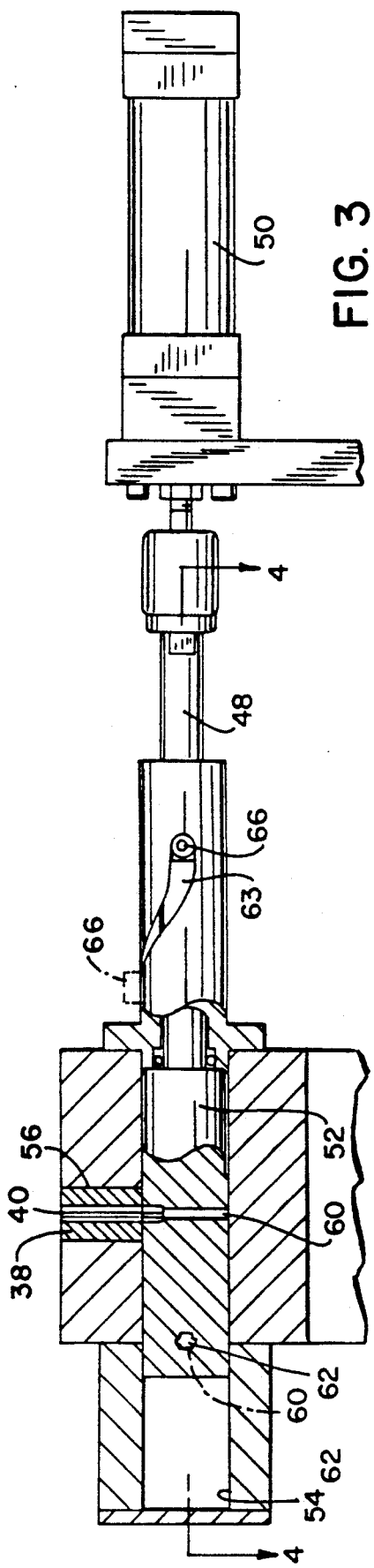
FIG. 3 is a side view of the pellet escapement plunger for the system shown in FIG. 1.
Figure 4:
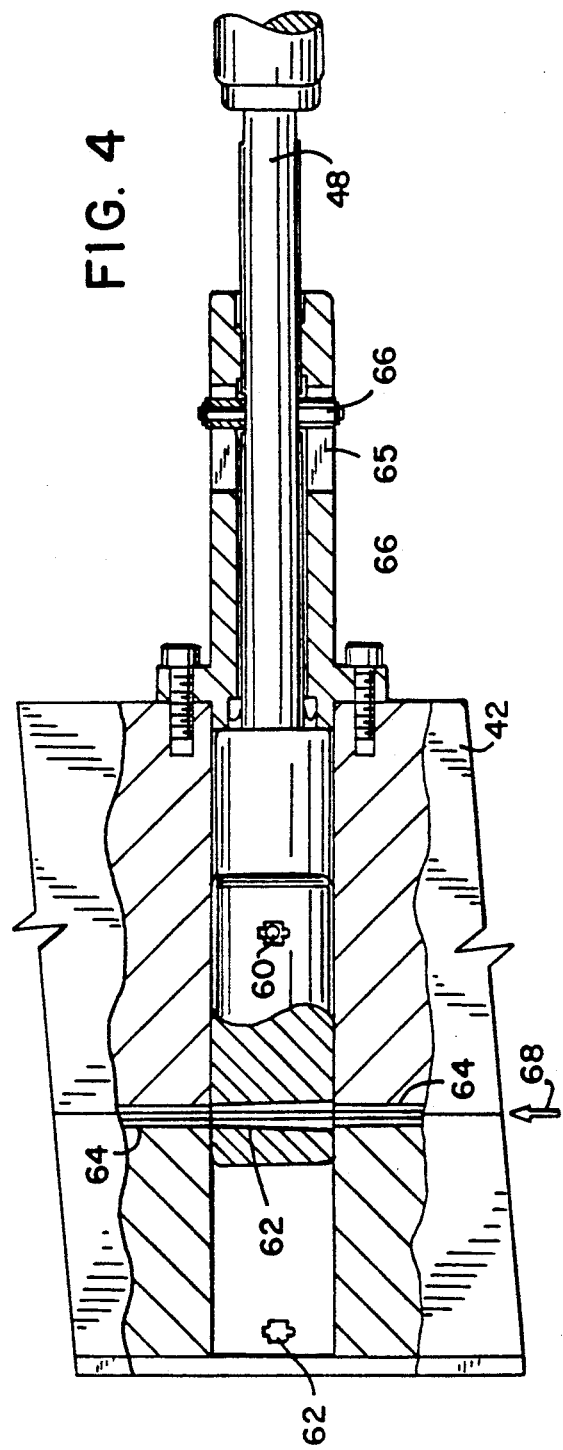
FIG. 4 is a top view of the pellet escapement plunger of FIG. 4.
Figure 5:
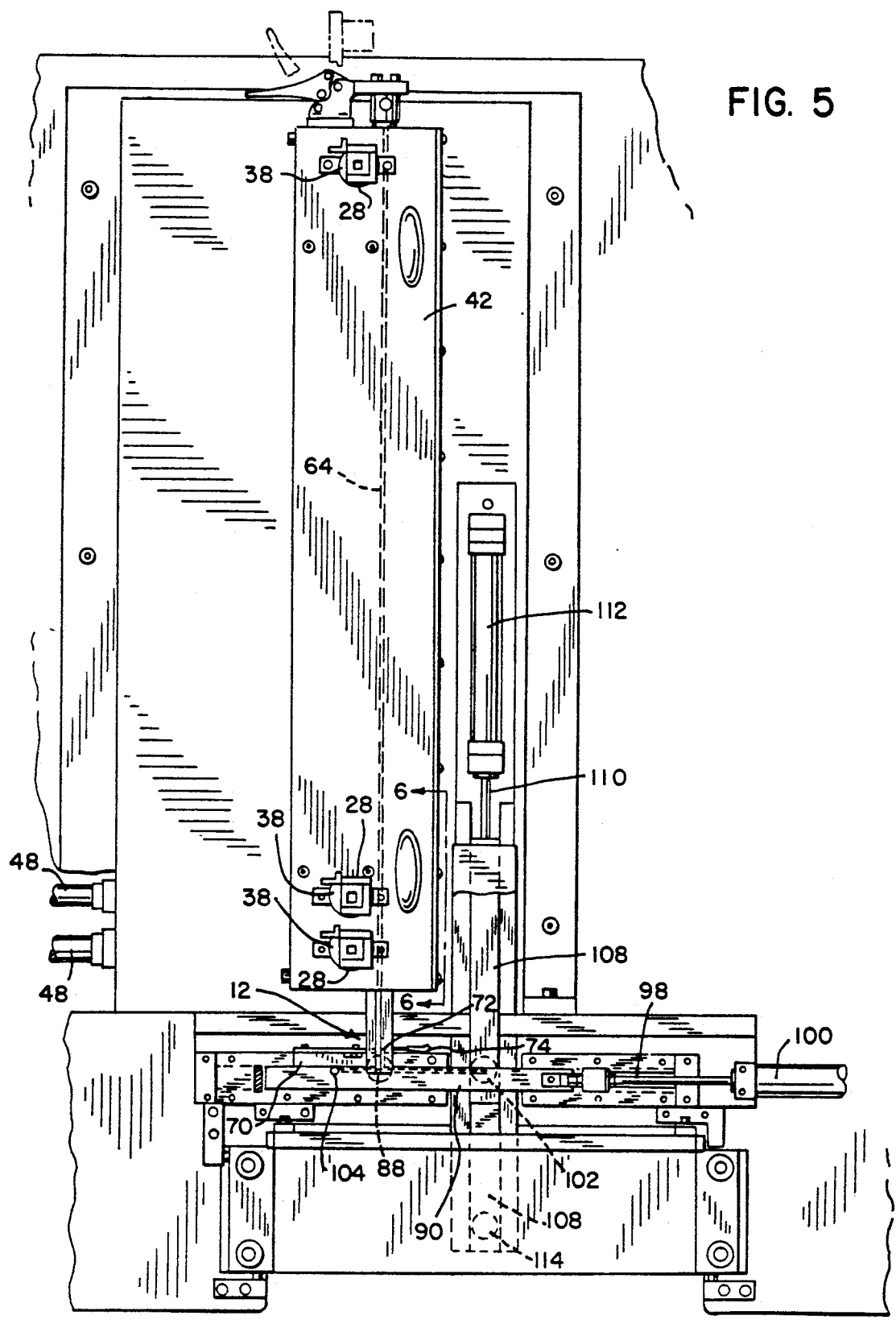
FIG. 5 is a top plan view illustrating the relationship between the pellet escapement path and the first and second transfer slides for the system shown in FIG. 1.

As specifically shown in FIG. 5, a plurality of pellet storage and feeder magazines 28 and transfer blocks 38 are mounted in parallel on the distributor housing 42. Each magazine 28 and block 38 are associated with an escapement plunger 48 and cylinder 50 (FIGS. 3 and 4). At the outer end of each escapement plunger is a cylindrical pellet carrier 52 which is slidably carried in the complementary channel 54 in the distributor housing 42. Each escapement plunger 48 is normally in the position shown in FIG. 3. Typically, a pellet 30 will drop from the associated magazine 28 through the transfer block channel 40 and an associated transfer passage 56 of the distributor housing and into a pellet receiver socket 58 provided in the associated escapement plunger.

A through channel 60 is provided in the escapement plunger in communication with the socket 58. The through channel 60 is slightly smaller than the socket to assure that the pellet will not fall through the channel when it falls into the receiver socket. A second through channel 62 is also provided in the escapement plunger and is at a right angle to the channel 60 and socket 58. The channel 62 is generally the shape of but slightly larger than the pellet 30, to permit easy passage of a pellet through the channel.

Figure 6:
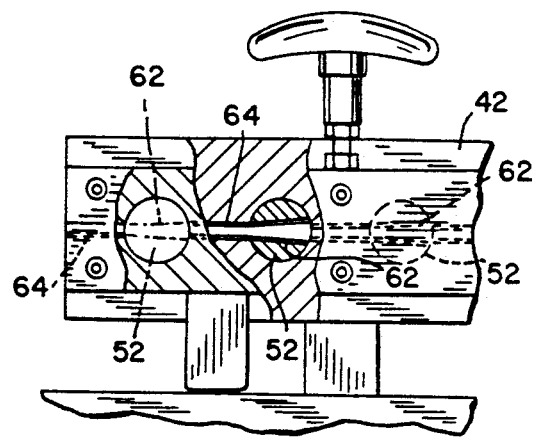
FIG. 6 is a fragmentary view taken generally the line 6—6 of FIG. 5.

When the carrier 52 is in the position of FIGS. 3 and 4, the channel 62 is in alignment with a passageway 64 which runs the entire length of the distributor housing 42 (See FIGS. 5 and 6). When each of the pellet carriers 52 associated with the respective feeder magazines 28 is in the normal position of FIGS. 3 and 4, a clear, through passageway comprising distributor channel 64 and carrier channels 62 runs the entire length of the distributor housing 42 (see FIGS. 5 and 6).

As shown in FIGS. 3 and 4, when the carrier 52 is moved from the illustrated fully retracted position to the fully extended position shown in phantom, the carrier rotates 90°, aligning the pellet socket 58 and channel 60 of the carrier with the passageway 64 in the distributor housing. A cam 65 is mounted on the housing 42 and is in communication with a cam follower 66 provided on the plunger 48. As the plunger moves from right to left, as shown, the cam follower rides in the cam 65 in the well known manner to rotate the escapement plunger and associated carrier 90° as they move to the extended position. This aligns the pellet socket 58 and through channel 60 with the channel 64 in the distributor housing.

Upon selection of one of the plurality of distinct pellets in each of the various sockets 58, in accordance with the selection step 26 of FIG. 1, the respective cylinder 50 associated with the selected carrier 52 is energized, moving the carrier from right to left as illustrated. At this point, a transfer signal, as shown at step 67 of FIG. 1, is energized and a pressurized air flow is introduced in the well-known manner, as shown at arrow 68 of FIG. 4, to transfer the pellet from the socket 58 through the distributor channel 64 and the aligned carrier channels 62 and into the test station 12 (see FIG. 5). In the preferred embodiment, each of the through channels 62 provided in the pellet carriers 52 is slightly tapered with the enlarged end 63 being at the air-in side of the channel to reduce the restriction of the pellet 30 as it moves through the transfer passage defined by the channels 62 and 64.

As specifically shown in FIG. 5, the air channel 64 terminates at the test station gate 70 which is the entry point for the initial test station 12 of FIG. 1. When the gate 70 is closed, the pellet is stopped at end point 72 of the distributor channel 64. An optical sensor probe 74 is located in alignment with end point 72 of the air channel and senses the presence of a pellet. Once the pellet has entered this position, the pellet carrier 52 from which the pellet was released is returned to its normal position in accordance with the carrier return step 78 of FIG. 1. When the carrier returns to the position shown in FIGS. 3 and 4, the next pellet in the associated magazine 28 is introduced into the pellet socket 58 of the carrier.

Figure 9:
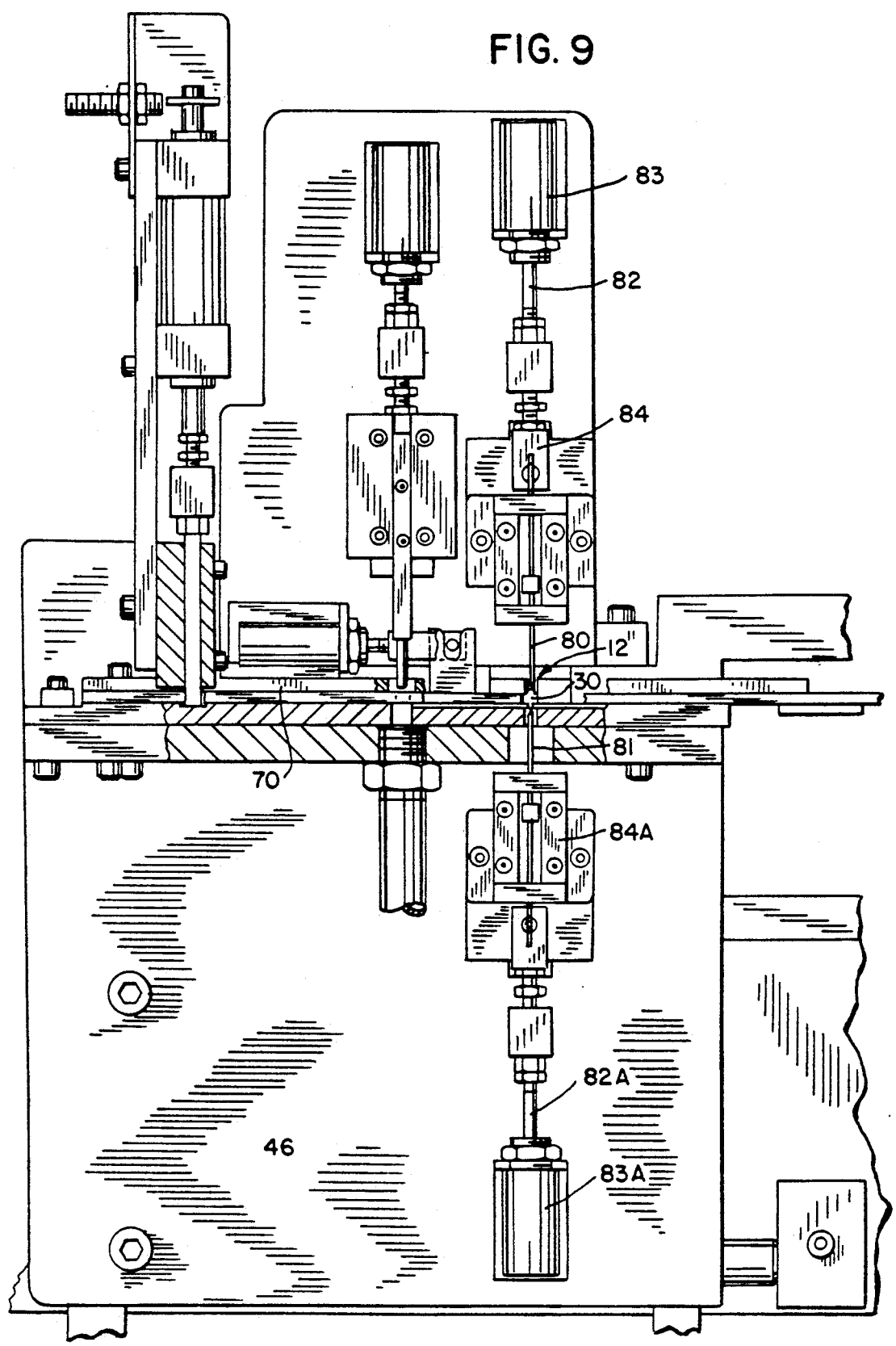
FIG. 9 is a front plan view of the resistance check station for the system of FIG. 1.

During the test sequence 12 of FIG. 1, the gate 70 is opened and the pellet is introduced into a pellet receptacle 88 in slide 90. The gate then closes, permitting the next pellet to be transferred to probe 74 in the manner described. The pellet in receptacle 88 is maintained at the test point 72 at this time. Turning now to FIGS. 9 and 10, it will be seen that a test sensor probe 80, 81 is located in alignment with the test point 72 of the distributor channel 64. In the preferred embodiment, this probe is a nickel plated probe with a copper clamp for engaging and reading the resistor element in the pellet such as, by way of example, one hundred (100) ohms. The probe is in direct alignment with the contact points on the resistor element of the pellet when the pellet is held at position 72 by slide 90.

The plungers 82, 82A of cylinders 83, 83A are connected to the probe 80, 81 via typical drive systems 84, 84A, whereby the probes are moved into engagement with the pellet whenever it is in position 72. When the probes are moved to a contact position, they engage the resistor element and measure the resistance of the pellet in accordance with the read step 76 of FIG. 1 to compare it with a pre-selected specific resistance range and determine whether the pellet is accepted or rejected, in accordance with the comparator step 86. After the pellet resistance has been read, the cylinders 83, 83A are operative to withdraw the probes. Once the probes are fully withdrawn, the slide 90 is moved to transfer the pellet to the next station in the process.

Slide 90 is a portion of the transfer mechanism for transferring accepted and rejected pellets, in accordance with steps 92, 94 and 96 of FIG. 1. The specific configuration of slide 90 is best shown in FIG. 5. As there shown, the slide 90 is secured to a plunger 98 which is controlled by the cylinder 100. During the testing sequence, the slide and plunger are in the position shown in FIG. 5, with the pellet receptacle in direct alignment with the air passage 64 of the distributor housing. When the gate 70 is opened and the pellet is released from the position 72, the positive pressure created by the air flow in channel 64 transfers the pellet into the socket 88 of the slide 90, for testing. If the pellet is within the acceptable resistance range, the pellet is transferred to the right to position 102, as shown in FIG. 5. If the pellet is not within the specified resistance range, the slide 90 is moved to the left, as shown, to move the pellet socket and the pellet to the position 104 (FIG. 5) where it is ejected into a reject bin as indicated at step 94 of FIG. 1. When the pellet is rejected, a signal is generated in the well known manner and sent to the pellet select mode 10 via lines 106, assuring that the system is not indexed to a new pellet magazine and restarting the system, again releasing a pellet from the same storage/feeder magazine 28 as the previous, just rejected pellet.

Figure 7:
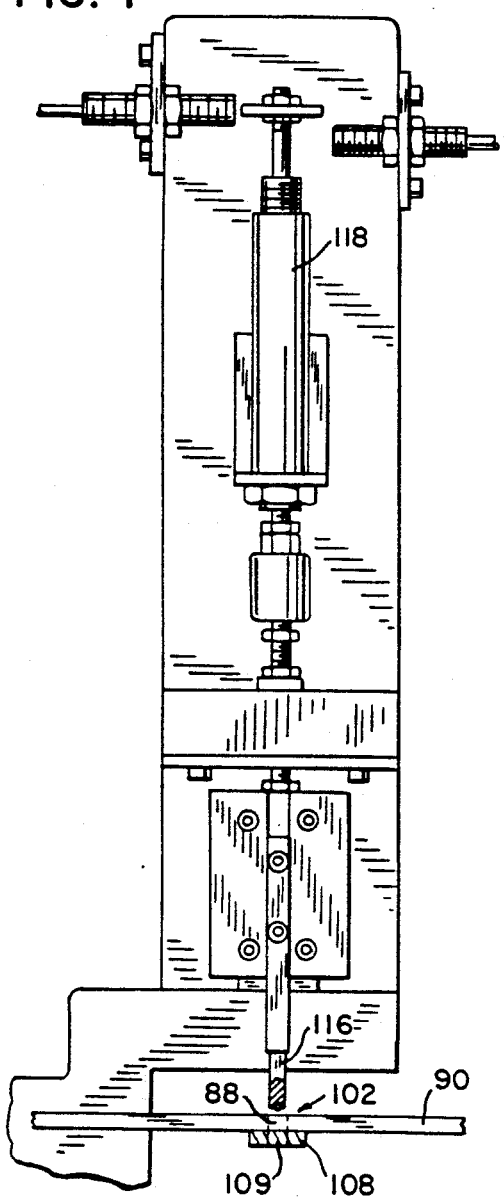
FIG. 7 is a partial front plan view of the mechanism shown in FIG. 5.
Figure 8:
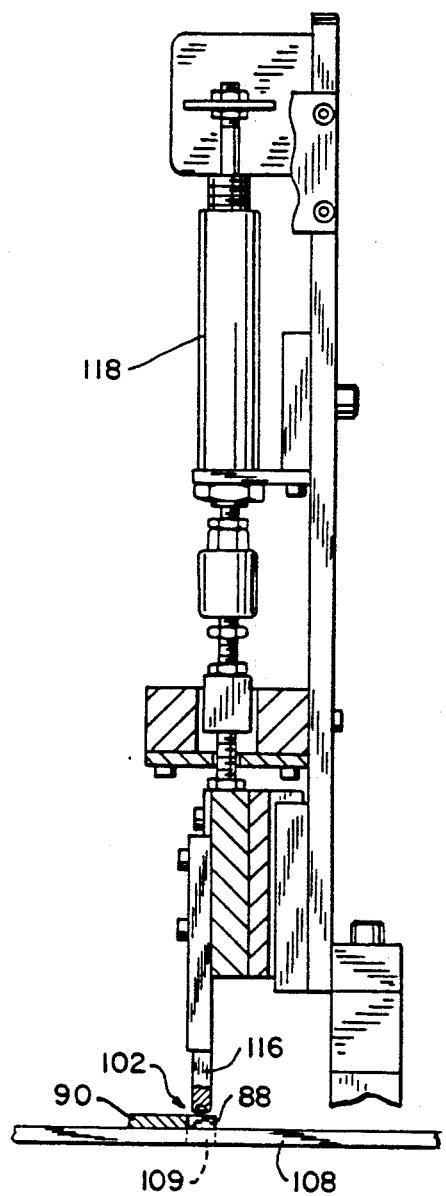
FIG. 8 is a partial side plan view of the mechanism shown in FIG. 5.

When the pellet passes the resistance test, it enters the pellet load mode of the system, as indicated at 14 in FIG. 1. The pellet is moved to transfer point 102 by slide 90, as best shown in FIGS. 5, 7 and 8. As there shown, the slide 90 intercepts the path of a second pellet transfer slide 108 at point 102. As shown in FIG. 5, the slide 108 is attached to a plunger 110 which is controlled by the cylinder 112 to move the slide between the two positions shown in FIG. 5, wherein the pellet receptacle 109 of slide 108 moves between the transfer position 102 (FIGS. 5, 7 and 8) and the pellet load position 114 (FIGS. 5, 11 and 12). When the pellet receptacle 109 of slide 108 is in alignment with the pellet receptacle 88 of slide 90 (FIGS. 7 and 8), the pellet falls through the receptacle 88 and into the receptacle 109. To assure a complete pellet transfer from slide 90 to slide 108, a transfer pin 116 is provided and is driven by the cylinder 118, as shown in FIGS. 7 and 8. When the pellet receptacle of the respective slides are in alignment, the cylinder 118 is energized to extend the plunger and associated pin 116 into the receptacle 88 of slide 90, pushing the pellet out of the receptacle 88 in slide 90 and into the receptacle 109 of slide 108. Once this is completed, the cylinder 118 is de-energized and the pin 116 is withdrawn to the position shown in FIGS. 7 and 8. At this point, slide 108 is advanced to move the pellet receptacle 109 from position 102 to position 114 as shown in FIGS. 5, 11 and 12. This transfers the pellet to the load station 120 in accordance with FIG. 1. At the same time, slide 90 returns receptacle 88 to test point 72 for receiving the next pellet from gate 70.

Figure 18:
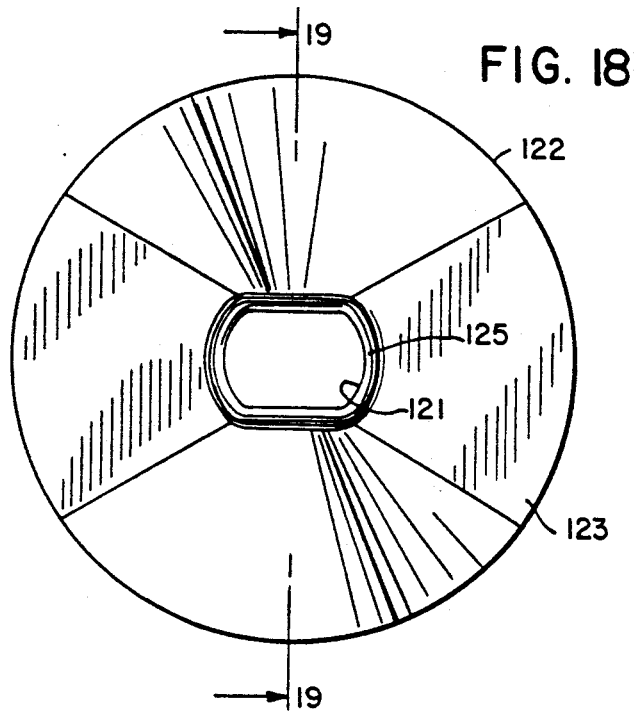
FIG. 18 is an end view of the upper swage tool of the mechanism shown in FIG. 13.
Figure 19:
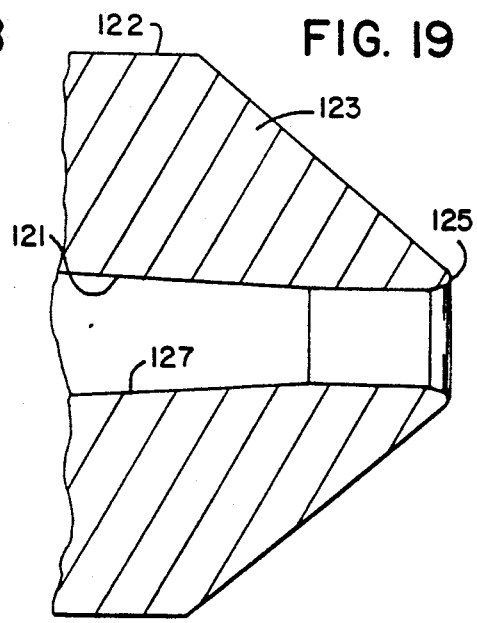
FIG. 19 is a section view taken generally along line 19—19 of FIG. 18.

Turning now to FIGS. 13 and 14, when the slide 108 is in the position locating the pellet at load point 114, it is in alignment with the central channel 121 of the upper swage tool 122 (see also FIGS. 18 and 19). At this point it is at the insert pellet step 124 of the pellet load sequence in accordance with FIG. 1. When the pellet has entered the insert pellet station 124, the key is loaded in accordance with step 126 of the key load sequence 16.

As shown in FIGS. 13 and 14, the assembly station comprises a rectangular frame 128 carrying a pair of slides 130 and 132. A lower swage press frame 134 is mounted for vertical movement on the slides 130, 132 and includes an assembly base plate 136 at the upper end thereof for receiving the key 140, see FIGS. 15-17. A ram 142 is secured in driving relationship with the frame 134 for moving the lower press assembly in a vertical direction along slides 130, 132 in the well-known manner. An upper swage press frame 144 is also mounted in sliding relationship on the slides 130 and 132 and includes at its lower end a top plate 146 which is complementary to the base plate 136.

As shown in FIG. 15, once the pellet has been positioned at insert position 114, the key 140 is loaded into the fixture 148 provided on the base plate 136. As the key enters the slide, it engages a sensing probe 150, signaling that a key has entered the assembly station. When the key is properly seated in the slide 148, the outer tips 141 of the key breaks the optical beam between the sensors 152 and 154. In the preferred embodiment, the sensor 150 is a Tri-tronic fiber optic sensor, Part No. BF-K-36 and the optical sensors 152 and 154 are Tri-Tronics fiber optic sensors, Part Nos. F-E-36 and F-E-36R, respectively. Once the key is properly seated in the fixture 148, the aperture 160 in the key is in alignment with the pellet 30 at the insert position 114.

A pilot unit 155 (FIGS. 13 and 14) is mounted in fixed relationship with the outer frame 128 on the slides 130 and 132 and includes a pilot pin 156 which is in alignment with the key aperture 160 and the pellet 30 at position 114. A cylinder 157 is in driving relationship with the pilot pin 156, and once the key is present and located as sensed by the sensors 152 and 154, the start step 162 in FIG. 1 is initiated. This energizes the pilot pin cylinder drive to extend the pilot pin 156 upward through the base plate 140 and the key aperture 160 to precisely position the key and key aperture in the fixture 148, as indicated at step 164 of FIG. 1.

Once the pilot has reached its fully extended position and the key has been precisely positioned in the fixture 148, the clamp function 166 of FIG. 1 is initiated. At this time, the upper ram 168 which is in driving relationship with the upper swage press frame 144, provides a downward force against the frame 144 and the top plate 146 to engage the key 140 and the base 136 and clamp the key in position. In the preferred embodiment, the clamping force of ram 168 is approximately 125 pounds.

Once the clamp is engaged and the key is clamped in position, the pilot drive cylinder 157 is energized to withdraw the pilot pin 156 from the key aperture and retract it from the assembly area, as indicated at pilot release step 170 of FIG. 1. When this occurs, the insert pellet step 124 is initiated.

A pellet inserter unit 171 is carried by the upper swage press frame and includes an inserter pin 172 positioned directly above the pellet loading position 114. The cylinder 174 includes a plunger 175 in driving relationship with the pin 172. When the plunger is extended, the inserter pin 172 moves downwardly toward the key assembly area. The tip of the pin engages the pellet 30 and forces it down through the central aperture 121 of the upper swage tool 122 and into the aperture 160 provided in the key 140. The pin has sufficient driving force to fully insert and seat the pellet in the aperture 160, as best shown in FIGS. 17, 22 and 23. Once the pellet has been properly seated, as indicated at step 176 of FIG. 1, the cylinder 174 is de-energized and the pellet inserter pin 172 is withdrawn from the upper swage tool back to the load position 114. At this point, slide 109 is retracted to the transfer position of FIGS. 3 and 4 as shown at step 177 of FIG. 1 and the pellet select station is signaled via line 175 to index and begin the sequence for loading the next pellet in the system as indicated at index step 181.

Once the pellet 30 is properly seated in the aperture 140, the inserter pin 172 is withdrawn and the slide 109 is returned to the transfer position, the swage cycle 18 of FIG. 1 is initiated. At this point, the swage press cycle 179 is initiated and the lower ram drive 142, which is in driving relationship with the lower swage press frame 134, applies an approximately 3,500 pound force against the frame 134, driving the lower swage frame, the assembly area comprising plates 136 and 146 and the upper swage press frame 144 up against the positive stop 180 mounted on the upper end of outer frame 128. This pushes the radial tips of the upper swage tool 122 and the radial tip of lower swage tool 182 into the body of the key 140 around the periphery of the aperture 160 to deform the key and press metal into the plastic pellet 30 as particularly shown at 283, 284, 285 and 286 of FIG. 24.

After the swage press cycle 179 of FIG. 1 is completed, the ram 142 is de-energized to release the force on the lower frame 134 and retract the swaging tools from the assembly area, in accordance with the open step 190 of FIG. 1. At this point, the fully assembled key 140 and pellet 30 are unloaded in accordance with step 192 of FIG. 1.

The process of the preferred embodiment of the invention will keep track of the number of keys made in sequence which are to have identical mechanical and electrical encoding characteristics. In the present example, three identically encoded keys are made for each lock. If the most recently unloaded key and pellet assembly is less than the third accepted key assembly in the sequence, the entire process is repeated with the same magazine being indexed at step 181 of FIG. 1, to provide an identical pellet in the loading area 114 for the next key to be assembled. If the last key unloaded was the third accepted key in sequence with identical encoding, the test sequence 20 is initiated, as indicated at 194 of FIG. 1.

When the test sequence 20 is initiated, each of the three identically encoded keys are sequentially loaded in a mated lock at step 196 and tested for proper mechanical and electrical interlock as indicated at steps 24 and 198 of FIG. 1. The resistance of the pellet 30 is rechecked at step 198 to conform that the pellet is still within the predetermined specification as tested in the initial test mode 12. If the three keys are acceptable, they are released for shipment as indicated at step 200 and an initiating signal is sent via line 201 from resistor comparator 198 to the select step 26 of the pellet select mode 10.

The initiating signal on line 201 is sent to the sequential select step 26 to select the next magazine with pellets having a different resistance characteristic for the next series of three identically encoded keys. In the event all of the keys do not pass the test sequence 20, the keys are aborted as indicated at step 202 of FIG. 1.

In order to better understand the invention, FIGS. 15-25 show enlarged views of the key/pellet assembly area of the mechanism of FIGS. 13 and 14 and the upper and lower swaging tools 122 and 182, respectively. FIGS. 15 and 16 show the assembly area with the swage tools removed. FIG. 17 includes the swage tools as positioned at the clamp 166 of FIG. 1, after the pilot pin 156 has been withdrawn and the pellet 30 has been inserted in the key 140. The key inserter pin 172 is also withdrawn. At this point, the process of FIG. 1 is ready to initiate the swage cycle 18.

FIGS. 18 and 19 show the upper swage tool 122. As there shown, the swage tool has a tapered lower end 123 which terminates in a radial tip 125 dimensioned to fit around the periphery of the pellet 30 and engage the perimeter of the aperture 160 provided in the key 140, as particularly shown in FIG. 23. The central through channel 121 of the upper swage tool may be slightly tapered as shown at 127 and for precisely sizing the pellet 30 as it is pushed through the central channel by the pellet inserter pin 156, as particularly shown in FIG. 22.

Figure 20:
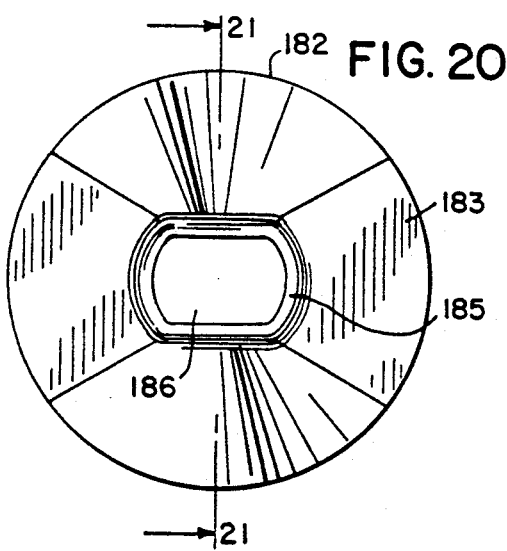
FIG. 20 is an end view of the lower swage tool of the mechanism illustrated in FIG. 13.
Figure 21:
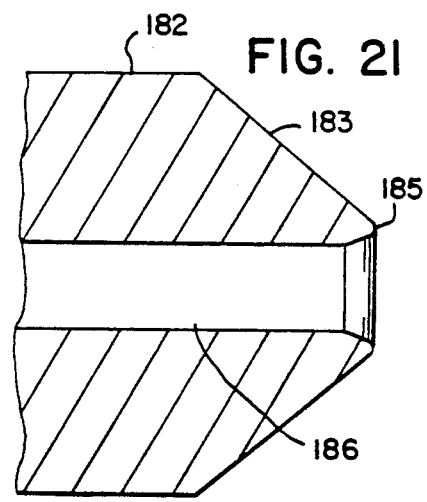
FIG. 21 is a section view taken generally along line 21—21 of FIG. 20.
Figure 25:
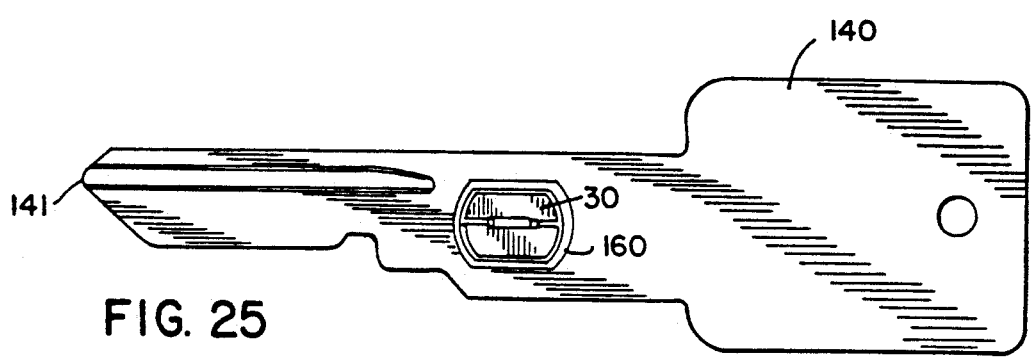
FIG. 25 is an illustration of the assembled key and pellet made in accordance with the process of FIG. 1.

The lower swage tool 182 is shown in FIGS. 20 and 21 and also includes a tapered end 183 terminating in a radial tip 185 adapted to be in axial alignment with the radial tip 125 of the upper swage tool and dimensioned to be outside the perimeter of the pellet 30 once it is inserted in the key, as shown in FIG. 23. The central aperture 186 of the lower swage tool is adapted to permit passage of the pilot pin 156 into the key aperture 160 during the pilot set step 164 of FIG. 1.

As particularly shown in FIG. 22, once the key 160 is clamped between the upper and lower swage tools 122 and 82, respectively, the pellet inserter pin 156 pushes the pellet through the aperture 121 of the upper swage tool 122 and, as shown in FIG. 23, inserts and snaps the pellet into the aperture 160 of key 140. At this point, as previously described, the pellet inserter pin 156 is withdrawn and the swaging step 18 of FIG. 1 is initiated, wherein, as shown in FIG. 24, the radial tips 125 and 185 of the upper and lower swage tools 122 and 182, respectively, are forced into the surface of the key 160, displacing the metal about the periphery of the aperture and into the plastic pellet 30 as shown at 283, 284, 285, and 286. Once the pellet 30 is permanently swaged in the key 140 in this manner, the pellet cannot be removed without destruction of either the key and/or the pellet. The mechanical coupling between the key and the pellet is at least as strong as prior adhesive or welding techniques and is desirable over those techniques because it does not expose the resistor element 217 of the pellet 30 to heat or chemicals which may alter the resistance level of the pellet.

The flow diagram of FIG. 1 broadly describes the sequencing of the steps of the process as carried out by the preferred embodiment of FIGS. 2-25. It will be readily understood by those skilled in the art that the control circuitry for energizing and de-energizing each of the various steps in the process may be enabled by limit switches measuring the travel of the various slides and frame members and sensors or probes, as described, tracking the progress of the pellet 30 through the process. The actual configuration of the control circuitry is in accordance with control systems well known to those skilled in the art.

While specific embodiments and features of the invention have been described herein, it will be readily understood that the invention includes all modifications and enhancements within the scope and spirit of the following claims.

We claim:

1. A method of mechanically securing a pellet with predefined electrical properties in a pellet receptacle aperture of a key made of a malleable material, the pellet of a softer material than the key, the method comprising the steps of:
   a. selecting a pellet from a plurality of pellets having a plurality of predefined electrical properties;
   b. confirming that said selected pellet has the preselected, predefined electrical properties;
   c. rejecting said selected pellet if it does not have the preselected, predefined electrical properties;
   d. accepting and inserting said selected pellet in the pellet receptive aperture in the key if the selected pellet has the preselected, predefined electrical properties; and e. mechanically displacing a portion of the malleable material of the key into the pellet for securing the key and pellet in assembled relationship.

2. The method of claim 1, wherein the displacing step comprises exerting a force against the outer surfaces of the key at selected points around the periphery of the pellet receptive aperture, thereby forcing the key material into the aperture and into the pellet.

3. The method of 1, wherein the pellet is made of a polyester material.

4. The method of claim 1, comprising the additional step of reconfirming that the pellet has retained the selected, predefined electrical properties after completion of the displacing step.

5. The method of claim 1, comprising the step of repeating steps (a) through (e), in sequence, a preselected number of times to make a preselected number of keys with the same predefined pellet.

6. The method of claim 1, comprising prior to the pellet inserting step the additional steps of:
   a. locating the aperture in the key in alignment with the pellet; and
   b. clamping the key in position with a non-destructive force.

7. The method of claim 6, wherein the locating step comprises inserting a pilot probe conforming to the dimensions of the pellet into the aperture of the key to position the key in alignment with the pellet.

8. The method of claim 7, wherein the clamping step is performed while the pilot probe is in the aperture of the key, and comprising the additional step of withdrawing the pilot probe from the aperture of the key after the clamping step and prior to the pellet inserting step.

9. The method of claim 7, wherein the clamping force and displacing force are applied to the key by the same means, the clamping force being non-destructive and the displacing force being sufficient to displace key material into the aperture of the key and the pellet.

10. The method of claim 9, wherein the displacing force is an order of magnitude greater than the clamping force.

11. The method of claim 10, wherein the clamping force is approximately two hundred pounds and the displacing force is approximately 3,500 pounds.

12. A method of mechanically securing a pellet with predefined electrical resistance properties to a key, comprising the steps of:
   a. serially advancing a plurality of pellets with a plurality of predefined electrical resistance properties to a ready station;
   b. feeding the first pellet in the series of pellets to a test station;
   c. testing the resistance properties of said pellet;
   d. rejecting said pellet if the pellet does not have the predefined electrical resistance properties;
   e. accepting and presenting said pellet to an inserting position if the pellet has the selected predefined electrical resistance properties;
   f. inserting said pellet into the key; and
   g. securing said pellet in the key.

13. The method of claim 12, wherein said resistance testing comprises, two electric probes, one contacting each side of said pellet for completing an electric circuit and measuring the resistance properties of said pellet.

14. The method of claim 12, wherein said inserting position is adjacent an aperture in said key.

15. The method of claim 12, wherein the method further comprises the step of positioning of the key to accept said pellet.

16. The method of claim 15, wherein the method further comprises the step of clamping the key after the position step.

17. The method of claim 12, wherein said securing step comprises swaging key material into said pellet.

18. A method of mechanically securing a pellet with predefined electrical resistance properties to a key, comprising the steps of:
   a. serially advancing a plurality of said pellets into a ready station;
   b. advancing one pellet per actuation into a transfer passage;
   c. propelling said pellet with air pressure to a test station;
   d. testing the resistance properties of said pellet by advancing electrical contact probes into contact with each side of the pellet for completing an electrical circuit and measuring the resistance properties of said pellet;
   e. presenting said pellet to an inserting station;
   f. positioning a key to accept the pellet;
   g. clamping the key in position with a non-destructive force;
   h. inserting the pellet into the key; and
   i. securing the pellet into the key by swaging key material into the pellet.

* * * * *